United States Patent [19]

Tatterson et al.

[11] Patent Number: 5,607,250

[45] Date of Patent: Mar. 4, 1997

[54] QUICK CONNECT COUPLING

[75] Inventors: Vincent P. Tatterson, Marleston; Mark Hilder, Hawker, both of Australia

[73] Assignee: Expertest Pty. Ltd., Australia

[21] Appl. No.: 407,640

[22] Filed: Mar. 21, 1995

[30] Foreign Application Priority Data

Jul. 13, 1994 [AU] Australia ................ PM6811

[51] Int. Cl.$^6$ ............ F16D 1/00; E21B 17/046
[52] U.S. Cl. ............ 403/325; 166/377; 166/385; 285/326; 403/294; 403/316; 403/331
[58] Field of Search ............ 166/377, 385; 285/84, 86, 325, 326; 403/6, 23, 294, 315, 316, 321, 322, 325, 331; 24/115 G

[56] References Cited

U.S. PATENT DOCUMENTS

| 821,829 | 5/1906 | Porter | 403/23 X |
|---|---|---|---|
| 1,018,556 | 2/1912 | Engle | 403/331 |
| 1,041,712 | 10/1912 | Gale et al. | 285/86 |
| 1,482,944 | 2/1924 | Russ | 403/322 |
| 1,853,299 | 4/1932 | Carroll | 403/321 |
| 1,899,846 | 2/1933 | Boyd | 403/331 |
| 3,276,799 | 10/1966 | Moore et al. | 285/86 X |
| 4,076,278 | 2/1978 | Chateau et al. | 285/325 X |
| 4,986,690 | 1/1991 | Cooksey | 403/325 X |

FOREIGN PATENT DOCUMENTS

| 984103 | 2/1951 | France | 403/331 |
|---|---|---|---|
| 1289985 | 9/1972 | United Kingdom | 403/322 |

*Primary Examiner*—Kenneth J. Dorner
*Assistant Examiner*—Andrea Chop
*Attorney, Agent, or Firm*—D. Peter Hochberg; Mark Kusner; Michael Jaffe

[57] ABSTRACT

A coupling comprising a male and female half (11, 12) that are coupled together in axial alignment. A keying portion (13) is provided at one end of the male half (11) which has at least one keying element (14) with a bearing surface (20). The female half (12) has an opening (17) located on one side with recesses (18) therein shaped for location of the keying element (14). The opening (17) allows the keying portion (14) to engage the opening (17) in a direction that is transverse to the aligned axis. The recess (18) has abutment surfaces (21) against which the bearing surfaces (20) locate when the keying portion (14) is engaged within the recess (18). The bearing (20) and abutment (21) surfaces prevent separation of the coupling when placed under tension along the aligned axis. The invention provides a simplified means for connection of the coupling while at the same time allowing relative rotation between the male and female halves (11, 12).

15 Claims, 2 Drawing Sheets

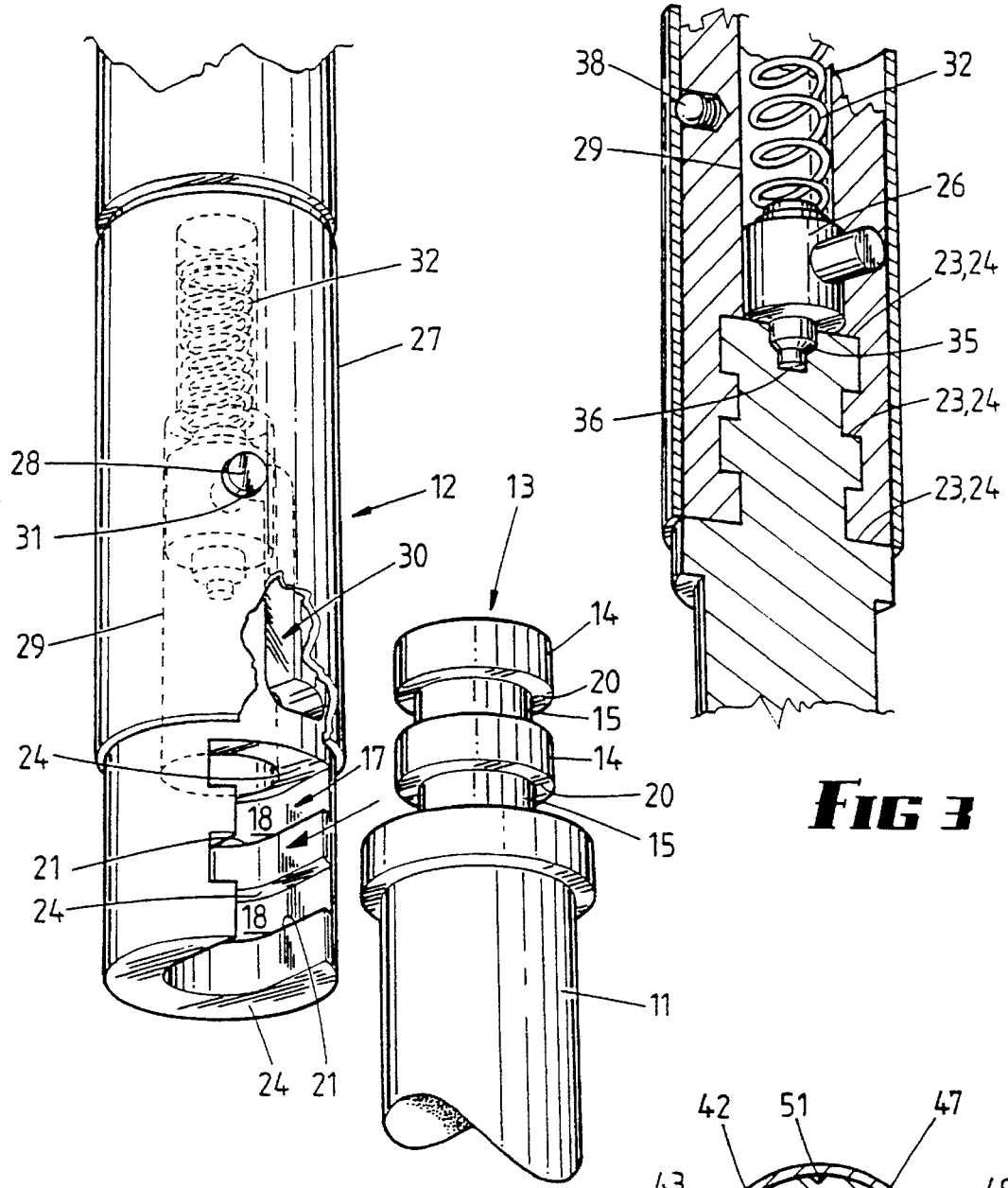
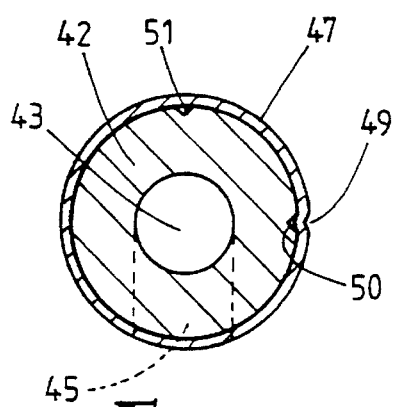

QUICK CONNECT COUPLING

FIELD OF INVENTION

This application describes an improved coupling arrangement, and in particular relates to a coupling that has an improved mechanism allowing rapid connection and disconnection.

In addition, the specification describes an improved rope socket which may be used in conjunction with the coupling.

Although the invention will have applications in numerous fields, for ease of disclosure, the description will be given in respect of couplings and rope sockets used in wireline operations. However, it will be realised that the scope of the invention is not to be limited to this particular application.

BACKGROUND OF THE INVENTION

In the oil and gas industry, it is often necessary to perform certain operations such as testing of wells or insertion and recovery of various components. This is normally achieved by lowering equipment known generally as a toolstring into and down a well via a wireline cable. Normally, a toolstring is attached to the wireline via a coupling and a rope socket. It is common to make use of a quick connect coupling comprising a male and female half which enable rapid connection and separation of the toolstring from the wireline. Such quick connect couplings normally use a bayonet style connecting action. The male and female halves of the coupling are generally connected respectively to the rope socket and toolstring via threaded connection.

Although the threaded connection is a common type of coupling method, the various components are readily damaged as a result of disconnecting or connecting the threaded components. This is due to the use of pipe wrenches which damage the surface of the components. In addition, it takes a considerable amount of time to connect and disconnect the couplings, particularly if the threads are seized.

Another problem with the bayonet style quick connect couplings is that they do not enable the toolstring to rotate independently of the coupling. The bayonet style coupling obviously turns into a locked position where it becomes fixed, thereby preventing any further rotation.

Therefore, it is an object of this invention to provide a coupling means which overcomes the abovementioned problems. A further aspect of the invention is to provide a quick action style coupling which allows relative rotation between the male and female halves of the coupling.

SUMMARY OF THE INVENTION

In its broadest form, the invention is a coupling comprising: a male and female half that are coupled together in axial alignment, a keying portion at one end of said male half having at least one keying element with a bearing surface, and an opening in the side of said female half having a recess therein shaped for location of said keying element, said opening allowing said keying portion to engage said opening in a direction transverse to said aligned axis for connecting said coupling, said recess having abutment surfaces against which said bearing surface locates when engaged, the bearing and abutment surfaces preventing separation of said coupling when placed under tension along said aligned axis.

Preferably, the keying element has a circular cross-section which enables the male and female halves to rotate with respect to one another about the aligned axis. However, the invention, in some applications, will be just as function with a non-circular cross-section keying element. The main function carried out by the keying element is to restrain tensile and compressive forces applied to the coupling along the aligned axis. This is achieved by having bearing and abutment surfaces which restrain at least tensile forces, and may also restrain compressive forces.

A great variety of shapes may be used and preferably the keying portion will comprise a shaft extending from the end of the male half with the keying element comprising a projection on the shaft. The bearing surface comprises a shoulder between the periphery of the projection and the shaft. For example, the keying element may comprise one or more circular disc-shape flanges extending around the shaft. However, other shapes such as conical sections or spheres may also be used.

The opening in the female half allows for easy location of the keying portion therein. In respect of keying elements having circular cross-sections, then the opening comprises a recess that engages only one half of the keying element. That is, when engaged, the recess extends only 180° around the keying element. This allows the keying portion to engage the opening in a direction which is transverse to the aligned axis. This is referred to as 'side loading' or 'side engagement'.

In order to ensure that the keying portion is held within the opening, a locking member is located within the female half that engages the end of the keying portion to prevent disengagement from the recess. Preferably, the locking member is journalled for movement along the longitudinal axis of the female half, and has a pin at one end that engages an aperture in the end of the keying portion. The locking member may be restrained from movement by a spring, once engaged, so as to ensure that the keying portion may not accidentally disengage from the opening.

A cover, slidably secured to the female half, may be used to cover the opening after engagement of the keying portion within the opening. Preferably, the cover comprises a cylindrical sleeve which can be slid along the female half to either open or close the opening.

In addition, the cover may be connected to the locking member so that these components move together. This enables the locking member to disengage as the cover is moved to expose the opening, or be engaged as the cover moves over the opening.

Another improvement addressed by this invention relates to rope sockets which are commonly used to connect toolstrings to a wireline. Known rope sockets comprise a socket body having a first bore extending into the body, and a second bore of a smaller diameter, at the upper end of the rope socket. The second bore is normally a diameter which allows the flexible line or wireline to be fed into the first bore. In order to connect the socket to a wireline, the line is fed through the second bore until it protrudes from the lower end of the rope socket. A sprung shock absorber and a bobbin is attached to the free end of the wire. The shock absorber and bobbin locate within and abut the end of the first bore and obviously prevent disconnection of the wireline from the rope socket. A toolstring or coupling is normally connected via a threaded coupling to the rope socket.

It is not uncommon for either the bobbin connection to become damaged or break, or for the flexible line or wireline to become damaged. This often occurs in the vicinity of the connection to the rope socket. In both cases, it will be necessary to remake the rope socket coupling, which with known rope sockets will require complete dismantling of the socket from the toolstring.

Another disadvantage with such rope sockets are that pipe wrenches are normally used to connect and disconnect the coupling. This results in damage to the external surface of the tope socket and toolstring. In addition, the process is time-consuming when attempting to disconnect seized or damaged threads.

Therefore, it is a further object of this invention to overcome the abovementioned problems with rope sockets, and in particular to produce a rope socket which is easier to manufacture and use.

Therefore, in a further aspect, the invention comprises a coupling according to the above description further comprising a rope socket secured to one end of said coupling comprising:

a socket body, a first bore extending part-way into said socket body from its first end, being the end that is secured to said coupling, a second bore of a diameter that is smaller than said first bore extending from the end of said first bore to the second end of said socket body, and a side opening in said socket body that opens a part of said first bore.

The side opening allows access to the end of the flexible line or wireline, and is sufficiently wide to enable the bobbin and other attachments to pass therethrough. This thereby enables the wireline to be connected or disconnected without having to disassemble the toolstring from the rope socket.

Preferably, the rope socket further comprises a rotating sleeve on the outside surface of the rope socket with an aperture therein that can be aligned with the side opening. Rotation of the sleeve will bring the aperture into or out of alignment with the opening thereby allowing it to be opened or closed. Preferably, a protuberance is used in association with the sleeve so as to hold it in its open or closed position.

BRIEF DESCRIPTION OF THE DRAWINGS

In order for the invention to be fully understood, a preferred embodiment will now be described, but it will be realised that the invention is not to be confined or restricted to the precise details of this embodiment. This embodiment is illustrated in the accompanying drawings in which:

FIG. 2 shows a perspective part cutaway view of the male and female halves with the keying portion and opening shown in detail, FIG. 3 shows a perspective cutaway view of the locking member engaging the upper end of the keying portion.

FIG. 4 shows a sectional view of the rope socket taken along lines 4—4 of FIG. 1.

DETAILED DESCRIPTIONS

Figure 1:
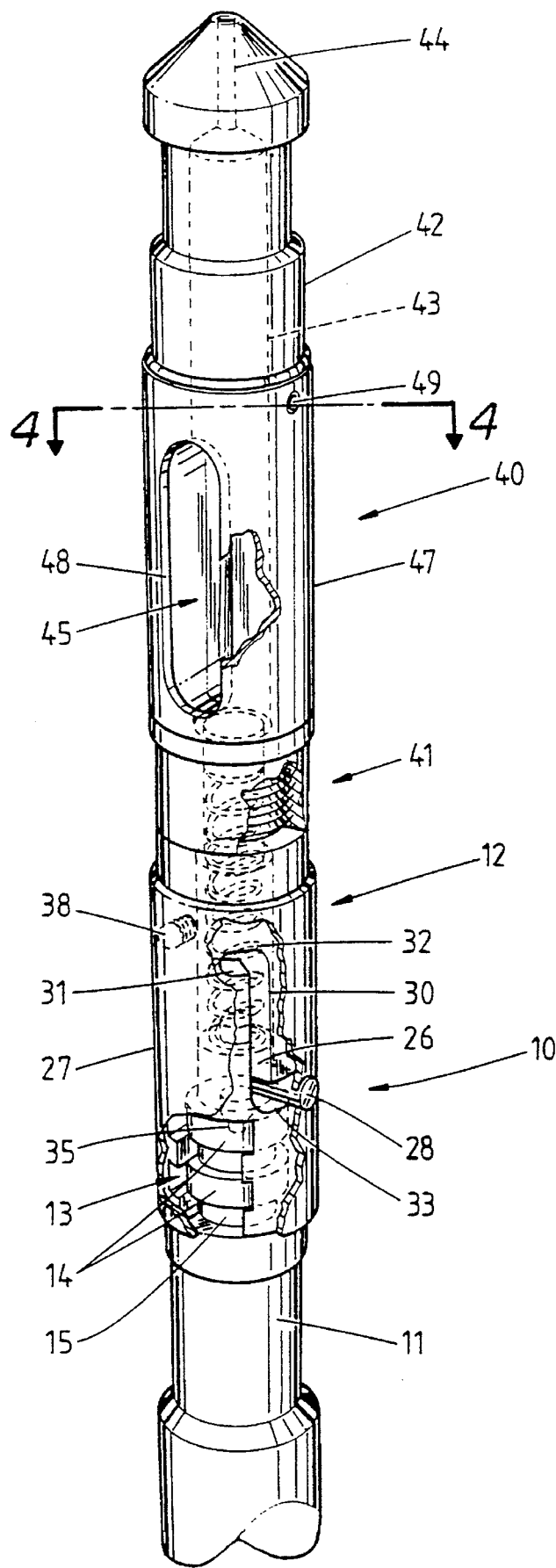
FIG. 1 shows a perspective, part cutaway view, of a coupling with a rope socket at the end of the female half.

As shown in FIG. 1, the coupling 10 comprises a male half 11 and a female half 12. A keying portion 13 is located at the end of the male half 11 having a pair of keying elements 14 on a shaft 15.

As seen in FIG. 2, the female half 12 has an opening 17 and recesses 18 within which the keying elements 14 of the keying portion 13 locate. Obviously, the recesses 18 have shapes which correspond to the keying elements 14 and the opening 17 allows the keying portion 13 to engage the opening 17 in a sideways direction, or in a direction which is transverse to the aligned axis of the male and female halves 11 and 12.

In accordance with the invention, the keying portion 13 is aligned with the opening 17, and moves laterally with respect to the longitudinally axis so that the keying elements 14 locate fully within each of the respective recesses 18. When in this position, the bearing surfaces 20 on each of the keying elements 14 locate against abutment surfaces 21 on each of the recesses 18. Engagement of the bearing and abutment surfaces 20 and 21 prevent separation of the male and female half 11 and 12 of the coupling 10 when subject to tensile loading. In addition to the bearing surfaces 20, there are also bearing surfaces 23, best shown in FIG. 3 on each of the keying elements 14 which locate against further abutment surfaces 24 which restrain compressive loading. The size of the keying elements 14 and the recesses 18 is such that a sliding fit is produced so that there is very little axial freeplay of the male half 11 with respect to the female half 12.

As can be seen from the description of this embodiment, the male half 11 will be free to rotate with respect to the female half 12 when the keying portion 13 is engaged within the opening 17. This is extremely useful, particularly in respect of wireline equipment, as it will help prevent twisting of the wireline. In addition, the connection of the coupling 12 is designed to enable rapid connection and separation without the use of any type of tool.

In order to secure the male half 11, a locking member 26 is slidably located within the female half 12. The locking member 26 is best seen in FIG. 3, but is also represented in dashed outline in FIG. 1 and FIG. 2. The locking member 26 is secured to a sleeve 27 via a location pin 28. The sleeve 27 is designed to both rotate and slide with respect to the end of the female half 12, and is arranged to cover the opening 17. Movement of the sleeve 27 with respect to the female half 12 also causes movement of the locking member 26. This is due to the locking member 26 and sleeve 27 being fixed with respect to one another via the location pin 28.

The locking member 26 is a generally cylindrical member located within a circular bore 29 which is positioned along the longitudinal axis of the female member 12. The location pin 28 is itself located within a slot 30 which controls the extent of movement of both the sleeve 27 and the locking member 26. The slot 30 has a first notch 31 at its upper end which is designed for engagement by the location pin 28 by rotation of the sleeve 27. This in turn of course rotates the locking member 26. When the location pin 28 is engaged within the first notch 31, the locking member 26 is held away from the keying portion 13 to allow separation of the coupling 12, and the sleeve 27 is retracted to expose the opening 17. A spring 32 provides a compressive force to hold the locking member 26 and sleeve 27 in this position.

A second notch 33 is provided at the lower end of the slot 30 and is arranged for engagement by the location pin 28 to prevent accidental axial movement of the location pin 28 along the slot 30.

The locking member 26 has a pin 35 on its end which engages in an aperture 36 in the end of the keying portion 13. This prevents transverse movement of the keying portion 13 with respect to the longitudinal axis of the coupling 12.

Accordingly, when the keying portion 13 is located in the opening such that the keying elements 14 engage the recesses 18, the sleeve 27 is rotated to disengage the location pin 28 from the first notch 31 to allow the locking member 26 and sleeve 27 to move downwardly so that the sleeve 27 covers the opening 17. The pin 35 of the locking member 26 then engages the aperture 36. This simple movement of the sleeve 27 allows for rapid closure of the opening 17, and locking of the male half with respect to the female half 12. Obviously, the engagement of the various bearing and abutment surfaces 20, 21, 23 and 24 prevent axial movement of the male half with respect to the female half as a result of compressive or tensile loading that might be applied to the coupling 10.

In order to positively locate the sleeve 27 in its closed position so that it covers the opening 17, a detent ball 38 engages within a detent recess within the inner surface of the sleeve 27. The detent ball 38 is located within a recess in the female half 12 and is provided with a spring in accordance with normal engineering practice.

A further detent recess may also be provided on the inner surface of the sleeve 27 at a position which enables engagement by the detent ball 38 when the location pin 28 engages in the first notch 31.

As shown in FIG. 1, a rope socket 40 is engaged to the upper end of the female half 12 via threaded coupling 41. The rope socket 40 comprises a socket body 42 having a first bore 43 that extends part way into the socket body 42 from its first end adjacent the threaded coupling 41. A second bore 44 extends from the upper end of the socket body 42 to the end of the first bore 43. The socket body 42 has a side opening 45 which extends into and opens part of the first bore 43.

The second bore 44 enables the cable of a wireline to locate through the second bore 44 into the first bore 43 and the cable is then drawn through the side opening 45. This enables end fittings such as bobbins and springs to be fitted to the cable and the side opening 45 is large enough to enable the fittings to be pulled inside the first bore 43. The bobbin engages against the shoulder formed between the first and second bores 43 and 44 thereby preventing release of the wireline cable from the socket body 42.

A sleeve 47 having an aperture 48 is located on the socket body 42 and is able to rotate. This enables the aperture 48 to be positioned with respect to the side opening 45 to either open or close it. A dimple 49 is formed within the sleeve 47 and the dimple 49 locates in corresponding recesses 50 and 51 within the socket body 42 to positively engage the sleeve 47 in either its open or closed position. (See FIG. 4)

Obviously, the use of such a rope socket 40 enables the connection or remaking of a connection without the need to disconnect the rope socket 40 from the coupling 10 or the toolstring.

As will be seen from the above description, the coupling 10 will be as strong as a threaded coupling, but at the same time the joining of the male and female halves 11 and 12 so as to engage the coupling will be much quicker and will not involve the use of any tools which would otherwise damage the surface of the various components. The coupling 10 will also enable rotation of the toolstring with respect to the wireline cable. In addition, the use of the improved rope socket 40 will enable rapid connection or maintenance of the wireline cable with respect to the socket body 42.

The invention claimed is:

1. A coupling comprising:

a male and female half that are coupled together in axial alignment, a keying portion at one end of said male half having at least one keying element with a bearing surface, and an end portion, an opening in the side of said female half having a recess therein shaped for location of said keying element, said opening allowing said keying portion to engage said opening in a direction transverse to said aligned axis for connecting said coupling, said recess having abutment surfaces against which said bearing surface locates when engaged, said bearing and abutment surfaces preventing separation of said coupling when placed under tension along said aligned axis, a locking member within said female half engageable with the end portion of said keying portion to prevent said keying portion disengaging from said recess, said locking member journaled for movement along the longitudinal axis of said female half, and a cover slidably secured to said female half, said cover engageable with said locking member to move said locking member along the longitudinal axis of said female half.

2. A coupling according to claim 1 wherein said male and female halves are free to rotate with respect to each other about said aligned axis.

3. A coupling according to claim 1 wherein said keying portion comprises a shaft extending from the end of said male half with said keying element comprising a projection on said shaft, said bearing surface comprising a shoulder between the periphery of said projection and said shaft.

4. A coupling according to claim 3 wherein said projection is circular in shape.

5. A coupling according to claim 4 wherein said keying element further comprises a plurality of projections that are spaced along said shaft.

6. A coupling according to claim 1, wherein said locking member further comprises a pin at its end that engages an aperture in the end portion of said keying portion.

7. A coupling according to claim 1, wherein said cover is movable between a first position where it covers said opening and a second position where said opening is uncovered.

8. A coupling according to claim 7 wherein said locking member and said cover are connected such that said locking member is engaged by moving said cover to said first position and disengaged by moving said cover to said second position.

9. A coupling according to claim 7, wherein said coupling further comprises a detent-type lock to positively locate said cover in the first position where it covers said opening.

10. A coupling according to claim 1 further comprising a rope socket secured to one end of said coupling, said rope socket comprising:

a socket body having a first end secured to said coupling and a second end, a first bore extending part-way into said socket body from the first end of the socket body, a second bore of a diameter that is smaller than said first bore, said second bore extending from the second end of said socket body to the first bore, and a side opening in said socket body that opens a part of said first bore.

11. A coupling according to claim 10 wherein said rope socket further comprises a rotating sleeve on the outer surface of said rope socket with an aperture therein which can be aligned with said side opening, the rotation of said sleeve bringing said aperture into or out of alignment with said side opening, thereby allowing opening or closing of said side opening.

12. A coupling according to claim 11 wherein said rope socket further comprises a protuberance which holds said sleeve in its open or closed position.

13. A coupling comprising a male and female half that are coupled together in axial alignment, a keying portion at one end of said male half having at least one keying element with a bearing surface, an opening in the side of said female half having a recess therein shaped for location of said keying element, said opening allowing said keying portion to engage said opening in a direction transverse to said aligned axis for connecting said coupling, said recess having abutment surfaces against which said bearing surface locates when engaged, said bearing and abutment surfaces preventing separation of said coupling when placed under tension along said aligned axis, and a rope socket secured to one end of said coupling comprising:

a socket body having a first end secured to said coupling and a second end, a first bore extending part-way into said socket body from the first end of the socket body, a second bore of a diameter that is smaller than said first bore, said second bore extending from the second end of said socket body to the first bore, and a side opening in said socket body that opens a part of said first bore.

14. A coupling according to claim 13, wherein said rope socket further comprises a rotating sleeve on the outer surface of said rope socket with an aperture therein which can be aligned with said side opening, the rotation of said sleeve bringing said aperture into or out of alignment with said side opening, thereby allowing opening or closing of said side opening.

15. A coupling according to claim 14, wherein said rope socket further comprises a protuberance which holds said sleeve in its open or closed position.

* * * * *